United States Patent
Ng et al.

(10) Patent No.: US 11,871,426 B2
(45) Date of Patent: Jan. 9, 2024

(54) PRE-CONFIGURED AND FAST UPLINK BIT RATE SWITCHING

(71) Applicant: Nokia Technologies Oy, Espoo (FI)

(72) Inventors: Man Hung Ng, Swindon (GB); Nitin Mangalvedhe, Hoffman Estates, IL (US); Rapeepat Ratasuk, Inverness, IL (US)

(73) Assignee: Nokia Technologies Oy, Espoo (FI)

(*) Notice: Subject to any disclaimer, the term of this patent is extended or adjusted under 35 U.S.C. 154(b) by 238 days.

(21) Appl. No.: 17/466,234

(22) Filed: Sep. 3, 2021

(65) Prior Publication Data

US 2023/0071788 A1  Mar. 9, 2023

(51) Int. Cl.
  *H04W 72/23*  (2023.01)
  *H04L 5/00*  (2006.01)

(52) U.S. Cl.
  CPC ........... *H04W 72/23* (2023.01); *H04L 5/0064* (2013.01)

(58) Field of Classification Search
  CPC ..... H04W 72/23; H04W 72/11; H04L 5/0064; H04L 5/0044; H04L 5/0051; H04L 5/0094
  See application file for complete search history.

(56) References Cited

U.S. PATENT DOCUMENTS

| | | | | |
|---|---|---|---|---|
| 2019/0357262 | A1* | 11/2019 | Cirik | H04W 76/27 |
| 2020/0235898 | A1* | 7/2020 | Loehr | H04W 80/02 |
| 2020/0351729 | A1 | 11/2020 | Rastegardoost et al. | 36/72 |
| 2020/0389282 | A1 | 12/2020 | Turtinen et al. | 5/98 |
| 2022/0303892 | A1* | 9/2022 | Awadin | H04L 5/0092 |
| 2022/0322418 | A1* | 10/2022 | Kim | H04L 1/0008 |
| 2023/0060894 | A1* | 3/2023 | Rastegardoost | H04W 56/001 |

FOREIGN PATENT DOCUMENTS

CN    115086985 A  *  9/2022

OTHER PUBLICATIONS

"PDSCH and PUSCH resource allocation", CATT, 3GPP TSG RAN WG1 Meeting 90bis, R1-1717833, Oct. 2017, 9 pages.
"SR procedure for NR", Nokia, Nokia Shanghai Bell, 3GPP TSG-RAN WG2 #99bis, R2-1710817 Update of R2-1708766, Oct. 2017, 6 pages.

* cited by examiner

*Primary Examiner* — Shailendra Kumar
(74) *Attorney, Agent, or Firm* — Joseph C. Drish; Harrington & Smith

(57) ABSTRACT

An apparatus includes at least one processor; and at least one non-transitory memory including computer program code; wherein the at least one memory and the computer program code are configured to, with the at least one processor, cause the apparatus at least to: receive from a network a configuration of two or more uplink grants; transmit uplink data to the network during operating in a given time with one of the two or more uplink grants; and operate with a first operation following receiving an indication of triggering the first operation for the apparatus, or following the apparatus autonomously triggering the first operation; wherein operating with the first operation corresponds to at least using the one of the two or more uplink grants for uplink transmission.

20 Claims, 6 Drawing Sheets

US 11,871,426 B2

PRE-CONFIGURED AND FAST UPLINK BIT RATE SWITCHING

TECHNICAL FIELD

The examples and non-limiting embodiments relate generally to communications and, more particularly, to pre-configured and fast uplink bit rate switching.

BACKGROUND

It is known to provide to a user equipment, from a base station, a configured grant for uplink transmission in a communication network.

SUMMARY

In accordance with an aspect, apparatus includes at least one processor; and at least one non-transitory memory including computer program code; wherein the at least one memory and the computer program code are configured to, with the at least one processor, cause the apparatus at least to: receive from a network a configuration of two or more uplink grants; transmit uplink data to the network during operating in a given time with one of the two or more uplink grants; and operate with a first operation following receiving an indication of triggering the first operation for the apparatus, or following the apparatus autonomously triggering the first operation; wherein operating with the first operation corresponds to at least using the one of the two or more uplink grants for uplink transmission.

In accordance with an aspect, and apparatus includes at least one processor; and at least one non-transitory memory including computer program code; wherein the at least one memory and the computer program code are configured to, with the at least one processor, cause the apparatus at least to: transmit to a user equipment a configuration of two or more uplink grants; and receive uplink data from the user equipment during operation in a given time with one of the two or more uplink grants; wherein operation with a first operation follows transmitting an indication of triggering the first operation for the user equipment, or follows the user equipment having autonomously triggered the first operation; wherein operation with the first operation corresponds to at least use of the one of the two or more uplink grants for uplink transmission.

In accordance with an aspect, an apparatus includes at least one processor; and at least one memory including computer program code; wherein the at least one memory and the computer program code are configured to, with the at least one processor, cause the apparatus at least to: receive from a network a configuration of two or more uplink grants; transmit uplink data to the network during operating in a given time with one of the two or more uplink grants; autonomously trigger, by the apparatus, a first operation; and operate with the first operation following the apparatus autonomously triggering the first operation; wherein operating with the first operation corresponds to at least using the one of the two or more uplink grants for uplink transmission.

BRIEF DESCRIPTION OF THE DRAWINGS

The foregoing aspects and other features are explained in the following description, taken in connection with the accompanying drawings.

DETAILED DESCRIPTION OF EXAMPLE EMBODIMENTS

Figure 1:
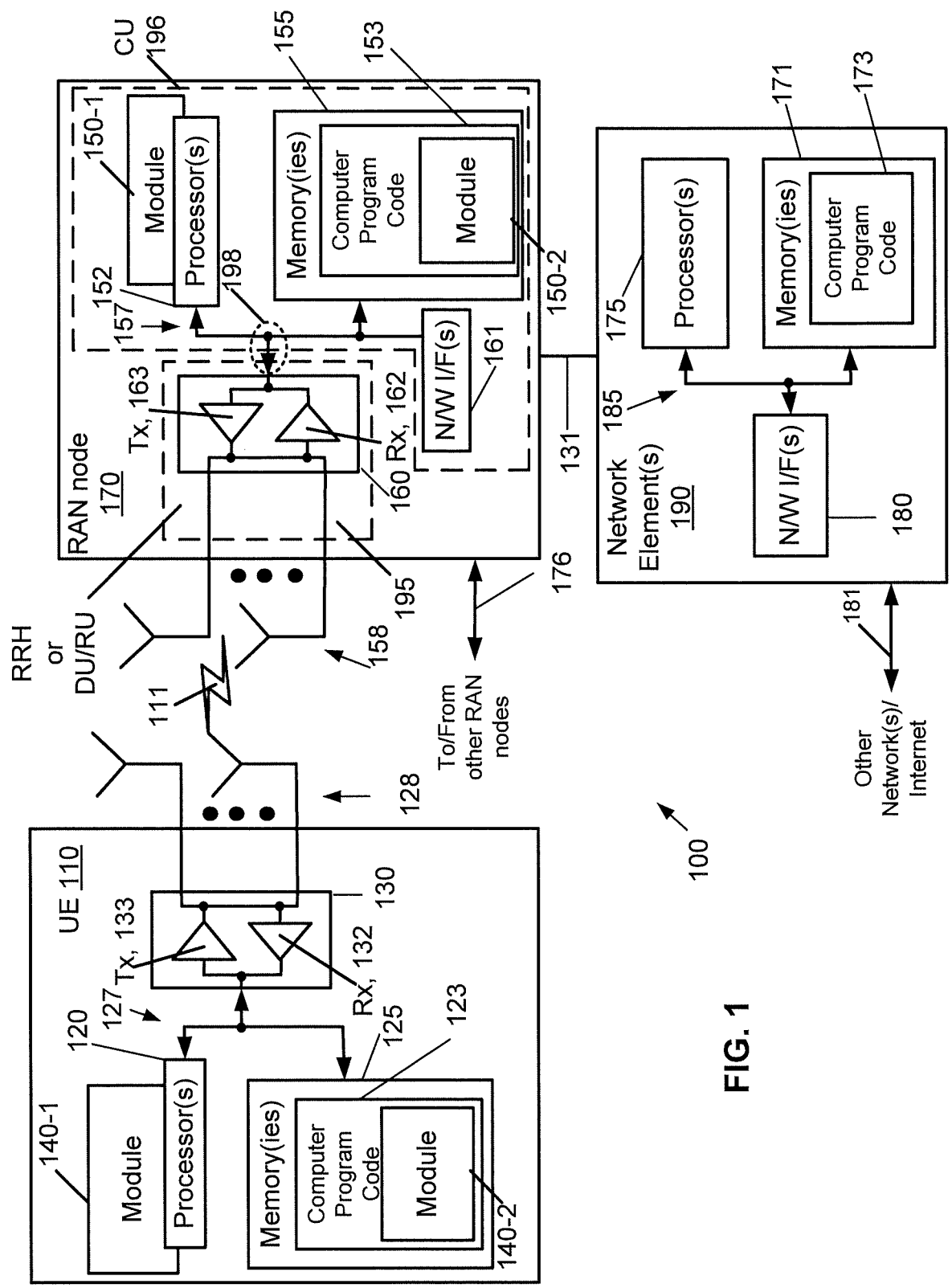
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 27. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs)

(gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, head mounted displays such as those that implement virtual/augmented/mixed reality, as well as portable units or terminals that incorporate combinations of such functions.

Accordingly, UE 110, RAN node 170, and/or network element(s) 190, (and associated memories, computer program code and modules) may be configured to implement (e.g. in part) the methods described herein, including pre-configured and fast uplink bit rate switching. Thus, computer program code 123, module 140-1, module 140-2, and other elements/features shown in FIG. 1 of UE 110 may implement user equipment related aspects of the methods described herein. Similarly, computer program code 153, module 150-1, module 150-2, and other elements/features shown in FIG. 1 of RAN node 170 may implement gNB/TRP related aspects of the methods described herein. Computer program code 173 and other elements/features shown in FIG. 1 of network element(s) 190 may be configured to implement network element related aspects of the methods described herein.

Having thus introduced a suitable but non-limiting technical context for the practice of the example embodiments, the example embodiments are now described with greater specificity.

Support of reduced capability NR devices (RedCap devices) is being specified in Rel-17 (RP-210918). RedCap devices are targeted for the following three classes of use cases: 1) industrial wireless sensors, 2) video surveillance, and 3) wearables.

Configured grant operation specified for NR devices is also to be supported for RedCap devices. In this operation, periodic uplink transmission is configured through dedicated RRC signaling, where the configuration provides uplink grant information including time domain allocation, frequency domain allocation, MCS and TBS in addition to the periodicity of the grant. A UE may be provided with multiple configured grants, in which case the gNB reserves resources for each of the grants. For many applications used by RedCap devices, configured grant operation may be useful.

While the Rel-17 work item is focused on basic support of RedCap devices, enhancements are to be considered in Rel-18. In the Rel-18 workshop that was held in June 2021 under the RAN plenary, various enhancements were proposed for inclusion in the Rel-18 work item. Enhancements to configured grant operation for RedCap devices may also be considered in Rel-18.

One of the categories of use cases for RedCap devices is video surveillance, for which devices may be provided with UL configured grants (for example, via rrc_ConfiguredUplinkGrant information elements).

Currently, ConfiguredUPlinkGrant is defined in 38.331 as:

```
rrc-ConfiguredUplinkGrant            SEQUENCE {
    timeDomainOffset                 INTEGER
(0..5119),
    timeDomainAllocation             INTEGER (0..15),
    frequencyDomainAllocation        BIT STRING
(SIZE(18)),
    antennaPort                      INTEGER (0 . . 31),
    dmrs-SeqInitialization           INTEGER (0..1)
OPTIONAL,   -- Need R
    precodingAndNumberOf Layers      INTEGER (0..63),
    srs-ResourceIndicator            INTEGER (0..15)
OPTIONAL,   -- Need R
    mcsAndTBS                        INTEGER (0..31),
    frequencyHoppingOffset           INTEGER (1..
maxNrofPhysicalResourceBlocks-1)
OPTIONAL,   -- Need R
    pathlossReferenceIndex           INTEGER
(0..maxNrofPUSCH-PathlossReferenceRSs-1),
    ...,
    [[
    pusch-RepTypeIndicator-r16       ENUMERATED
{pusch-RepTypeA, pusch-RepTypeB}
OPTIONAL,   -- Need M
    frequencyHoppingPUSCH-RepTypeB-r16   ENUMERATED
{interRepetition, interSlot}
OPTIONAL,   -- Cond RepTypeB
    timeReferenceSFN-r16             ENUMERATED
{sfn512}
OPTIONAL    -- Need S
    ]]
  }
```

UL traffic needs would be closer to DL traffic needs for these use cases. There would be scenarios in which the UL bit rate needs to be temporary increased by triggering events. E.g., video resolution needs to be temporary increased if a fire alarm sounds or some sensor readings are over the safe limits. While devices can be provided with two activated configured grants for low bit-rate and high bit-rate transmissions, this would be wasteful since each device uses the resources indicated by only one of the two grants. Therefore, protocol and signaling between the network and devices are necessary to enable such fast (and potentially urgent) UL bit rate switching without wasting network resources.

Switching between preconfigured uplink grant configurations and/or BWP switching may augment or supplement the examples described herein. However, the examples described herein include the UE-initiated aspects, in addition to base station/radio node related aspects.

The method described herein is as follows. Pre-configure two (or more) UL grants for a RedCap device (or a group of devices with same functionality), one for a first bit rate operation (e.g. an enhanced bit rate operation) and another for a second bit rate operation (e.g. a normal bit rate operation). Only one UL grant is active or activated at any given time, i.e., the operation is switched between normal bit rate and enhanced bit rate. The UL grant for normal bit rate operation is activated by default.

Resources for UL grants for enhanced bit rate operation can be shared among a group of devices with the same functionality, such that only one device (or a few devices) within the group can operate with an enhanced bit rate in any given time. Multiple shared resources can be configured for enhanced bit rate operation, one of which may be activated for a UE. When a few devices are activated for enhanced bit rate operation, configured grant resources may be shared on a contention basis or a contention-free basis.

Options for pre-configured UL grants (in one embodiment, the configured parameters for one grant can be dependent on the set or a subset of the parameters for the other grant) include (1-4): 1) Different BWPs with different UL BWs, 2) Different UL RB allocations in the same BWP. For example, the normal bit rate may be configured with only a subset of RBs from an enhanced bit rate allocation. 3) The same UL RB allocation with different UL power levels. 4) The same UL RB allocation with different periodicities. For example, the enhanced bit rate may have a periodicity of T while the normal bit rate may have a periodicity of 4T.

The enhanced bit rate can be operated for pre-configured period(s), or L1 (layer 1, where L1 is a physical layer) signaling can be used to trigger back to normal bit rate operation. Two ways of switching can be supported as described below, including network-initiated switching and UE-initiated switching.

Network-Initiated Switching

Define a fast L1 DL signaling such that the network can trigger fast switching from the configured grant for normal bit rate operation to the configured grant for enhanced bit rate operation when needed (e.g., in urgent cases), and back to normal bit rate operation under the control of the gNB, where options include DCI in PDCCH or an L1 signal.

DCI in PDCCH. DCI can be individual or group-based (e.g. using predefined RNTI values). If multiple UL grants for enhanced bit rate operation are configured, DCI can indicate which one is activated for the device (or a group of devices).

L1 signal, e.g., wake-up signal (WUS). L1 signaling can convey one or more of the following information (1-3): 1) Switching from one configured grant to another, 2) Deactivation of a configured grant, or 3) Configuration changes. An example of conveying signaling changes is that an L1 signal can convey switching from the first configured grant to the second configured grant with a change in the second configured grant. The configuration change may be given in DCI or via an RRC reconfiguration. A common RRC reconfiguration message may be used for a group of devices.

The L1 signal may have the following characteristics: The signal is UE-specific or group-specific, and/or either the same signal can be used for toggling between the two grants or separate signals can be defined.

UE-Initiated Switching

A fast L1 UL signaling may be defined such that the RedCap device can inform the network that it has autonomously triggered (or initiated to trigger) the enhanced bit rate operation when needed (e.g., in urgent case), or return back to normal bit rate operation. Options include (1-2): 1) Include with the last normal UL data transmission, e.g., a pre-defined level of measurement, MAC control message or using a reserved bit in the MAC sub-header. Alternately, DMRS (e.g. sequence or scrambling) can be used to indicate switching. 2) L1 signal, e.g., a dedicated signal, dedicated PRACH preamble, or UCI in PUCCH.

The RedCap device may need to wait for an ACK from the network before switching when the RedCap device autonomously triggers the enhanced bit rate operation under the control of the gNB. Waiting for the ACK may be implemented to avoid resource contention when UL grants of enhanced bit rate operation are shared among a group of devices with the same functionality, and they need to be active simultaneously. Waiting for the ACK may be implemented to allow transient time for the network to switch to higher UL bit rate reception from the corresponding device. The network may pre-configure whether an ACK is required before switching. An alternative option (without ACK) would be to pre-configure sufficient resources and network transient time for UL bit rate switching. L1 signaling defined in network-initiated switching may also be used as the ACK.

The proposed protocol and signaling between the network and devices enable fast (and potentially urgent) UL bit rate switching when needed for RedCap device use cases like video surveillance. Accordingly, the examples described herein are applicable to identified classes of use cases (like video surveillance) for RedCap Devices.

Networks and devices supporting fast UL bit rate switching for RedCap Devices are to apply the proposed protocol and signaling if/when the protocol and signaling are adopted by 3GPP.

Figure 2:
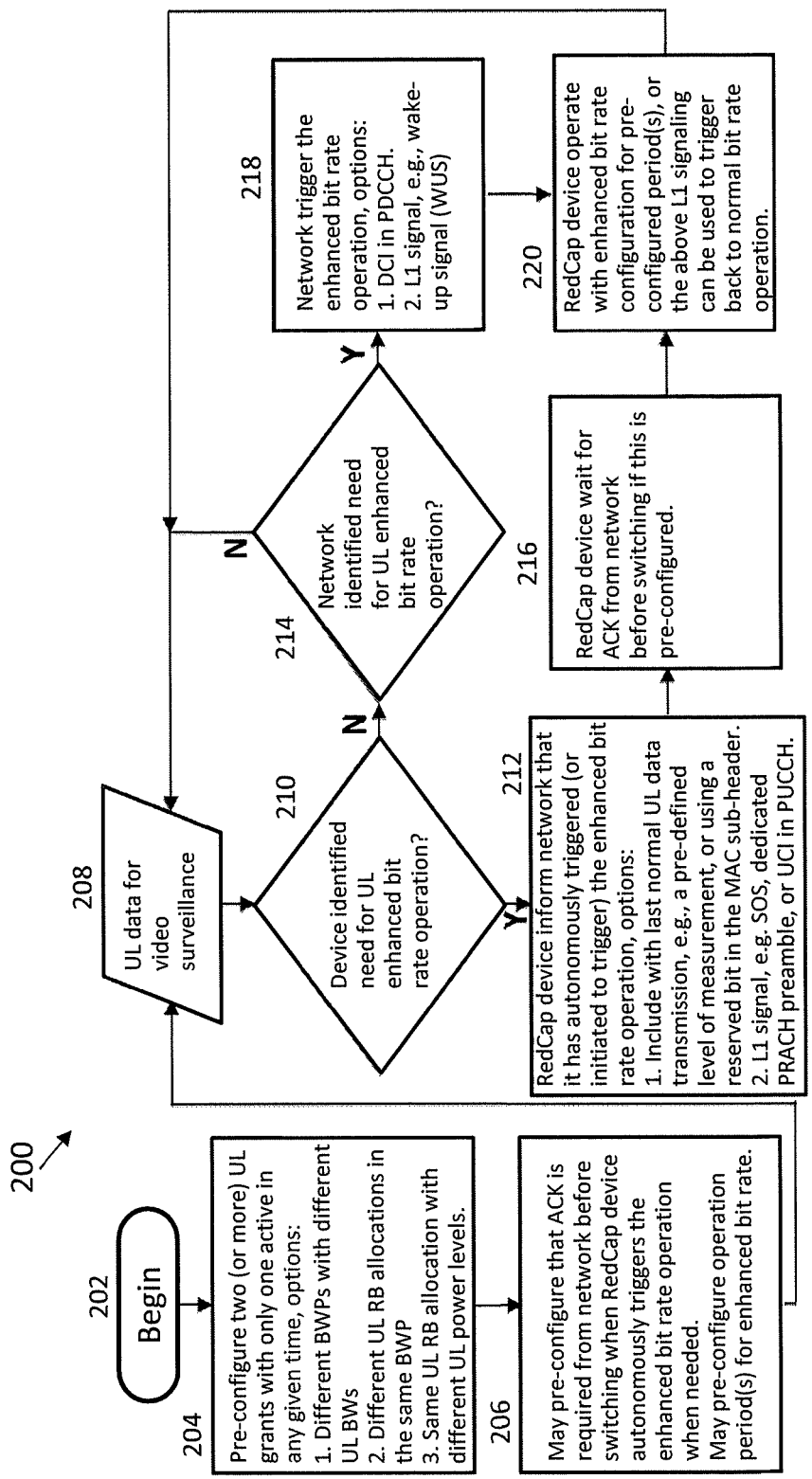
FIG. 2 is a flowchart showing the solution described herein.

FIG. 2 is a flowchart 200 showing the solution described herein. In FIG. 2, the RedCap device may refer to UE 110 and the network may refer to either the RAN node 170 or the network element(s) 190. At 202, the method begins. At 204, the method includes pre-configuring two or more UL grants with only one active in any given time period. Options at 204 include 1. Different BWPs with different UL BWs, 2. Different UL RB allocations in the same BWP, or 3. The same UL RB allocations with different UL power levels. At 206, the method may include pre-configuring that an ACK is required from the network before switching when the RedCap device autonomously triggers the enhanced bit rate operation when needed. Additionally at 206, the method may include pre-configuring operation period(s) for the enhanced bit rate.

At 208, the method considers the use case for video surveillance. At 210, the device determines whether a UL enhanced bit rate operation is needed (e.g. based on data arrival rate at the UE buffer or the amount of data at the UE buffer or based on the 5G QoS Identifier (5QI) value). In response to the device determining at 210 a need for UL enhanced bit rate operation (e.g. "Y"), the method transitions to 212. At 212, the RedCap device informs the network that it has autonomously triggered (or has initiated to trigger) the enhanced bit rate operation. At 212, a first option for the RedCap device informing the network that it has autonomously triggered (or initiated to trigger) the enhanced bit rate operation is to include the informing with the last normal UL data transmission, e.g. a pre-defined level of measurement, or by using a reserved bit in the MAC sub-header. At 212, a second option for the RedCap device informing the network that it has autonomously triggered (or initiated to trigger) the enhanced bit rate operation is to include the information within an L1 signal, e.g. a dedicated signal, a dedicated PRACH preamble, or UCI in PUCCH.

At 216, the RedCap device waits for an ACK from the network before switching if this is preconfigured. At 220, the RedCap device operates with the enhanced bit rate configuration for one or more pre-configured period(s), or the L1 signaling (referred to at 212 and 218) can be used to trigger back to the normal bit rate operation.

In response to the device at 210 not determining a need for a UL enhanced bit rate operation (e.g. "N"), the method transitions to 214. At 214, the network determines whether a UL enhanced bit rate operation is needed. In response to the network determining at 214 that a UL enhanced bit rate operation (e.g. "N") is not needed, the method transitions to 208. In response to the network determining at 214 that a UL enhanced bit rate operation is needed (e.g. "Y"), the method transitions to 218. At 218, the network triggers the enhanced bit rate operation. At 218, a first option is for the network to trigger the enhanced bit rate operation using DCI in PDCCH. At 218, a second option is for the network to trigger a L1 signal, e.g. a wake-up signal (WUS). Following 218, the method transitions to 220, and following 220, the method transitions to 208. As mentioned, at 220, the RedCap device operates with the enhanced bit rate configuration for one or more pre-configured period(s), or the L1 signaling (referred to at 212 and 218) can be used to trigger back to the normal bit rate operation.

Figure 3:
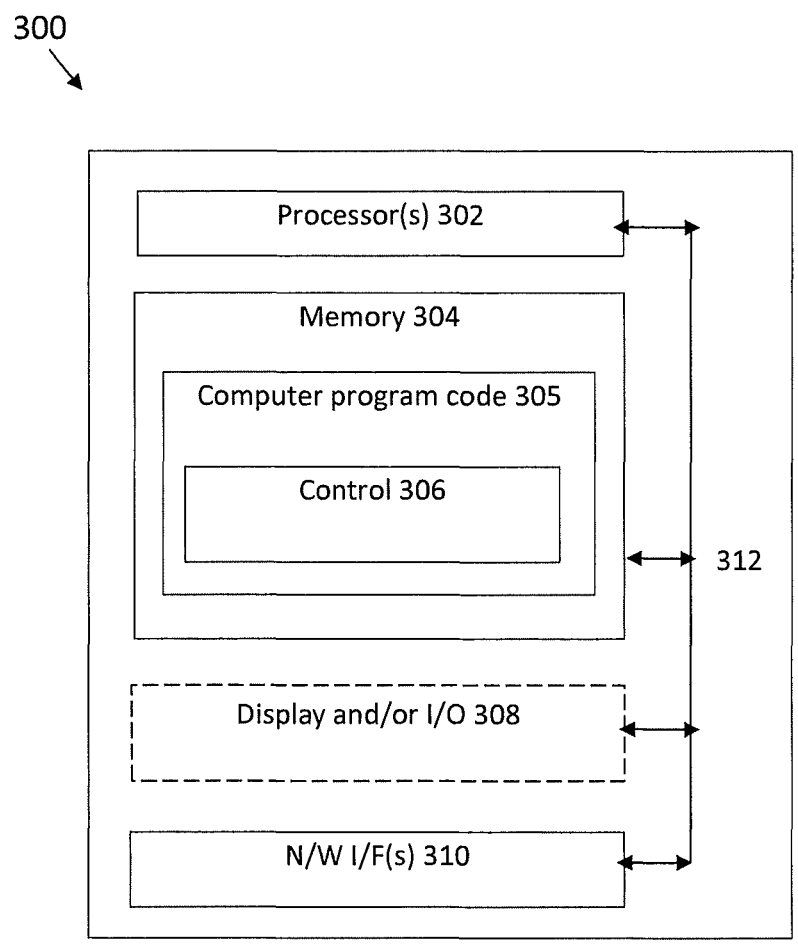
FIG. 3 is an example apparatus configured to implement the examples described herein.

FIG. 3 is an example apparatus 300, which may be implemented in hardware, configured to implement the examples described herein. The apparatus 300 comprises at least one processor 302 (an FPGA and/or CPU), at least one memory 304 including computer program code 305, wherein at the least one memory 304 and the computer program code 305 are configured to, with at least one processor 302, cause the apparatus 300 to implement circuitry, a process, component, module, or function (collectively control 306) to implement the examples described herein, including pre-configured and fast uplink bit rate switching. The memory 304 may be a non-transitory memory, a transitory memory, a volatile memory, or a non-volatile memory.

The apparatus 300 optionally includes a display and/or I/O interface 308 that may be used to display aspects or a status of the methods described herein (e.g., as one of the methods is being performed or at a subsequent time), or to receive input from a user such as with using a keypad. The apparatus 300 includes one or more network (N/W) interfaces (I/F(s)) 310. The N/W I/F(s) 310 may be wired and/or wireless and communicate over the Internet/other network(s) via any communication technique. The N/W I/F(s) 310 may comprise one or more transmitters and one or more receivers. The N/W I/F(s) 310 may comprise standard well-known components such as an amplifier, filter, frequency-converter, (de)modulator, and encoder/decoder circuitries and one or more antennas.

The apparatus 300 to implement the functionality of control 306 may be UE 110, RAN node 170, or network element(s) 190. Thus, processor 302 may correspond respectively to processor(s) 120, processor(s) 152 and/or processor(s) 175, memory 304 may correspond respectively to memory(ies) 125, memory(ies) 155 and/or memory(ies) 171, computer program code 305 may correspond respectively to computer program code 123, module 140-1, module 140-2, or computer program code 153, module 150-1, module 150-2, or computer program code 173, and N/W I/F(s) 310 may correspond respectively to N/W I/F(s) 161 or N/W I/F(s) 180. Alternatively, apparatus 300 may not correspond to either of UE 110, RAN node 170, or network element(s) 190, as apparatus 300 may be part of a self-organizing/optimizing network (SON) node, such as in a cloud. The apparatus 300 may also be distributed throughout the network 100 including within and between apparatus 300 and any network element (such as a network control element (NCE) 190 and/or the RAN node 170 and/or the UE 110).

Interface 312 enables data communication between the various items of apparatus 300, as shown in FIG. 3. For example, the interface 312 may be one or more buses such as address, data, or control buses, and may include any interconnection mechanism, such as a series of lines on a motherboard or integrated circuit, fiber optics or other optical communication equipment, and the like. Computer program code 305, including control 306 may comprise object-oriented software configured to pass data/messages between objects within computer program code 305. The apparatus 300 need not comprise each of the features mentioned, or may comprise other features as well.

Figure 4:
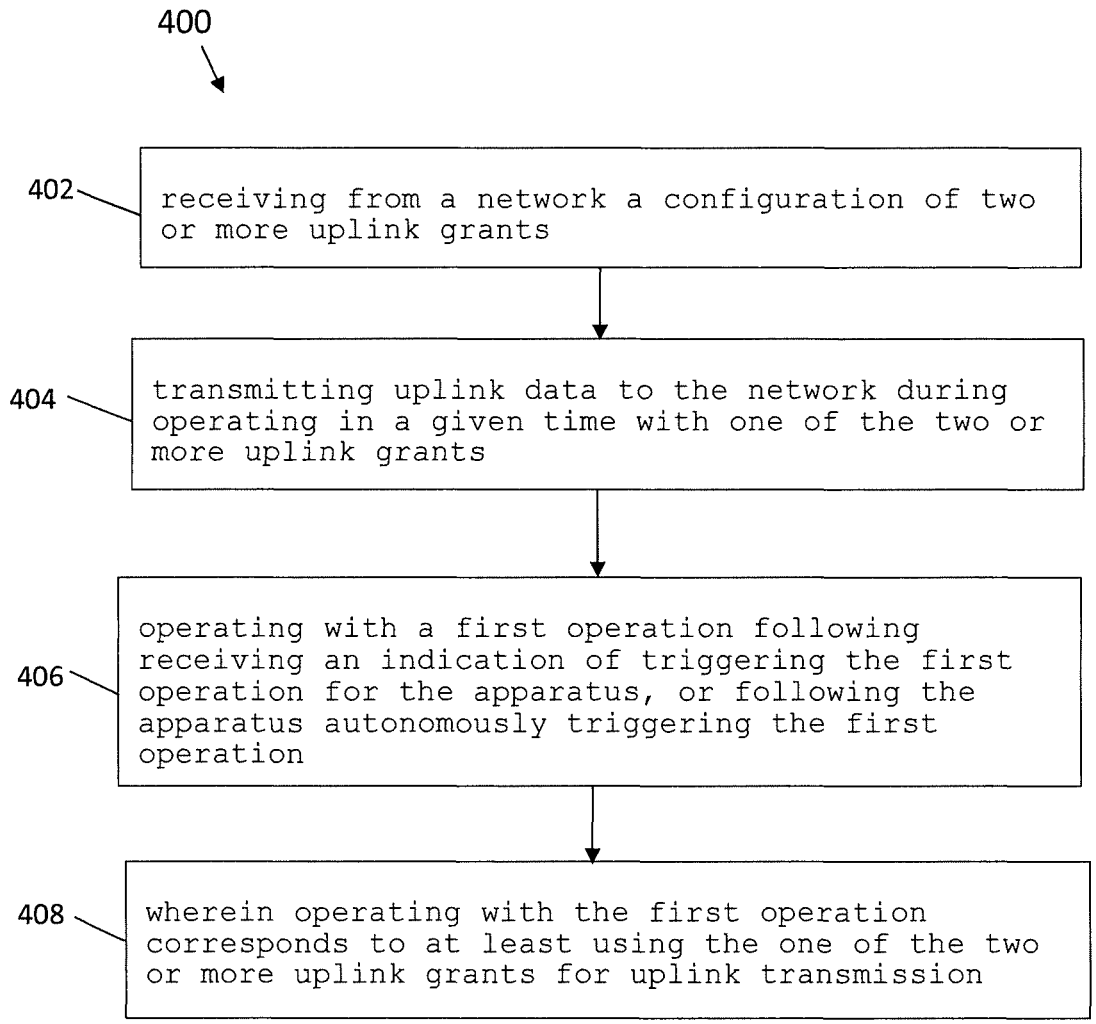
FIG. 4 is an example method performed with a user equipment to implement the examples described herein.

FIG. 4 is an example method 400 to implement the example embodiments described herein. At 402, the method includes receiving from a network a configuration of two or more uplink grants. At 404, the method includes transmitting uplink data to the network during operating in a given time with one of the two or more uplink grants. At 406, the method includes operating with a first operation following receiving an indication of triggering the first operation for the apparatus, or following the apparatus autonomously triggering the first operation. At 408, the method includes wherein operating with the first operation corresponds to at least using the one of the two or more uplink grants for uplink transmission. Method 400 may be performed with UE 110, apparatus 300, or a combination of those.

Figure 5:
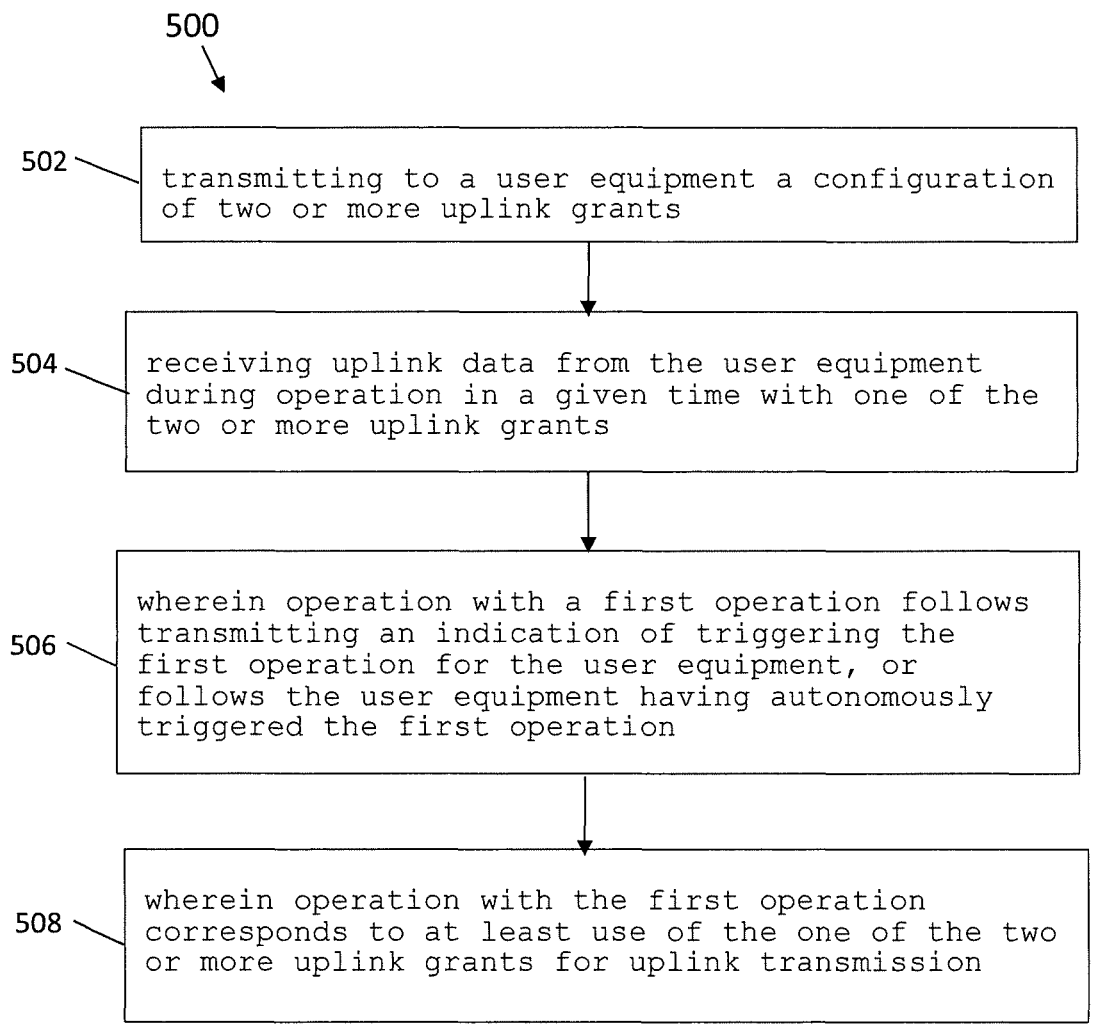
FIG. 5 is an example method performed with a base station to implement the examples described herein.

FIG. 5 is an example method 500 to implement the example embodiments described herein. At 502, the method includes transmitting to a user equipment a configuration of two or more uplink grants. At 504, the method includes receiving uplink data from the user equipment during operation in a given time with one of the two or more uplink grants. At 506, the method includes wherein operation with a first operation follows transmitting an indication of triggering the first operation for the user equipment, or follows the user equipment having autonomously triggered the first operation. At 508, the method includes wherein operation with the first operation corresponds to at least use of the one of the two or more uplink grants for uplink transmission. Method 500 may be performed with RAN node 170 (e.g. a gNB in 5G or equivalent structure in future standardizations), apparatus 300, or a combination of those.

Figure 6:
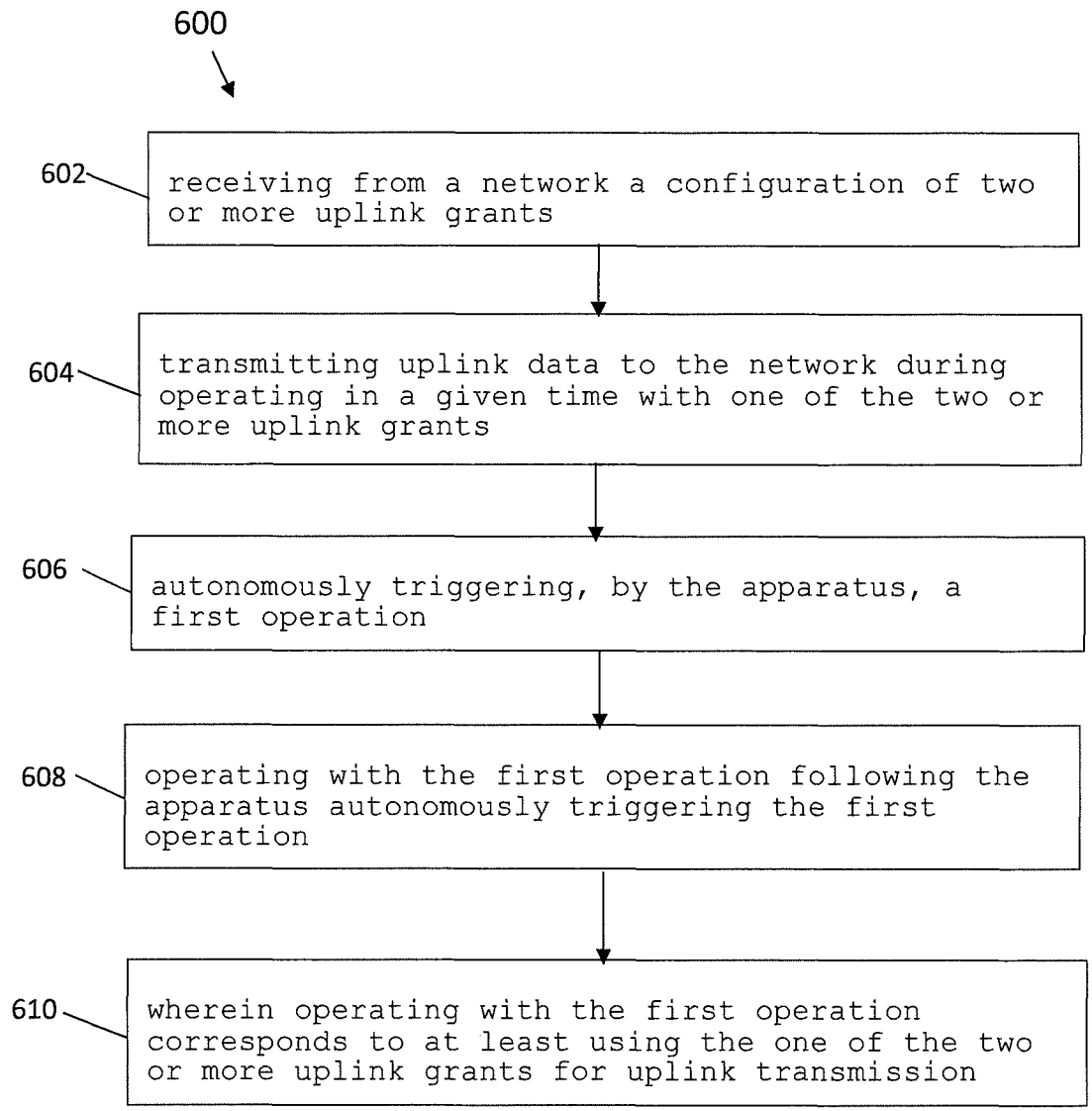
FIG. 6 is an example method performed with a user equipment to implement the examples described herein.

FIG. 6 is an example method 600 to implement the example embodiments described herein. At 602, the method includes receiving from a network a configuration of two or more uplink grants. At 604, the method includes transmitting uplink data to the network during operating in a given time with one of the two or more uplink grants. At 606, the method includes autonomously triggering, by the apparatus, a first operation. At 608, the method includes operating with the first operation following the apparatus autonomously triggering the first operation. At 610, the method includes wherein operating with the first operation corresponds to at least using the one of the two or more uplink grants for uplink transmission. Method 600 may be performed with UE 110, apparatus 300, or a combination of those.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The following examples 1-29 are provided herein, based on the described embodiments.

Example 1: An example apparatus includes at least one processor; and at least one non-transitory memory including computer program code; wherein the at least one memory and the computer program code are configured to, with the at least one processor, cause the apparatus at least to: receive from a network a configuration of two or more uplink grants; transmit uplink data to the network during operating in a given time with one of the two or more uplink grants; and operate with a first operation following receiving an indication of triggering the first operation for the apparatus, or following the apparatus autonomously triggering the first operation; wherein operating with the first operation corresponds to at least using the one of the two or more uplink grants for uplink transmission.

Example 2: The apparatus of example 1, wherein the at least one memory and the computer program code are further configured to, with the at least one processor, cause the apparatus at least to: inform the network that the apparatus has autonomously triggered the first operation.

Example 3: The apparatus of example 2, wherein the informing the network of the apparatus autonomously triggering the first operation is performed during a last uplink data transmission during operation with a second operation.

Example 4: The apparatus of example 3, wherein the informing the network of the apparatus autonomously triggering the operation with the first operation performed during the last uplink data transmission during operation with the second operation comprises transmission with one of at least: a pre-defined level of measurement; a medium access control message; a reserved bit in a medium access control sub-header; a demodulation reference signal sequence; or a scrambling of a demodulation reference signal.

Example 5: The apparatus of any one of examples 2 to 4, wherein the informing the network of the apparatus autonomously triggering the first operation comprises transmission with a physical layer signal.

Example 6: The apparatus of example 5, wherein the physical layer signal comprises one of at least: a dedicated signal; a dedicated physical random access channel preamble; or uplink control information in a physical uplink control channel.

Example 7: The apparatus of any one of examples 1 to 6, wherein the at least one memory and the computer program code are further configured to, with the at least one processor, cause the apparatus at least to: monitor for an acknowledgement from the network prior to switching to operating with the first operation from operating with a second operation when autonomously triggering the first operation under control of an access network radio node.

Example 8: The apparatus of any one of examples 1 to 7, wherein the apparatus is a reduced capability user equipment.

Example 9: The apparatus of any one of examples 1 to 8, wherein the configuration of two or more uplink grants is received with one of at least: different bandwidth parts with different uplink bandwidths; different uplink resource block allocations in a common bandwidth part; or a common uplink resource block allocation with different uplink power levels.

Example 10: The apparatus of any one of examples 1 to 9, wherein the indication of triggering the first operation for the apparatus is received with one of at least: downlink control information in a physical downlink control channel; or a dedicated physical layer signal.

Example 11: The apparatus of any one of examples 1 to 10, wherein the at least one memory and the computer program code are further configured to, with the at least one processor, cause the apparatus at least to: operate with the first operation for a predetermined period of time.

Example 12: The apparatus of any one of examples 1 to 11, wherein the at least one memory and the computer program code are further configured to, with the at least one processor, cause the apparatus at least to: operate with the first operation until receiving an indication from the network to switch to operation with a second operation.

Example 13: The apparatus of any one of examples 1 to 12, wherein the at least one memory and the computer program code are further configured to, with the at least one processor, cause the apparatus at least to: determine whether the network has given the indication of triggering the first operation for the apparatus; and in response to determining that the network has not given the indication of triggering the first operation for the apparatus, the apparatus performs the autonomously triggering the first operation.

Example 14: The apparatus of any one of examples 1 to 13, wherein the at least one memory and the computer program code are further configured to, with the at least one processor, cause the apparatus at least to: determine whether the first operation is to be used based on one of at least: a data arrival rate at a buffer of the apparatus; an amount of data at a buffer of the apparatus; or a value of a fifth generation quality of service identifier.

Example 15: An example apparatus includes at least one processor; and at least one non-transitory memory including computer program code; wherein the at least one memory and the computer program code are configured to, with the at least one processor, cause the apparatus at least to: transmit to a user equipment a configuration of two or more uplink grants; and receive uplink data from the user equipment during operation in a given time with one of the two or more uplink grants; wherein operation with a first operation follows transmitting an indication of triggering the first operation for the user equipment, or follows the user equipment having autonomously triggered the first operation; wherein operation with the first operation corresponds to at least use of the one of the two or more uplink grants for uplink transmission.

Example 16: The apparatus of example 15, wherein the at least one memory and the computer program code are further configured to, with the at least one processor, cause the apparatus at least to: receive information from the user equipment that the user equipment has autonomously triggered the first operation; transmit an acknowledgement to the user equipment following receiving from the user equipment the information regarding the user equipment having autonomously triggered the first operation; wherein the acknowledgement is configured to be processed with the user equipment prior to the user equipment switching to operating with the first operation from operating with a second operation when under control of an access network radio node.

Example 17: The apparatus of any one of examples 15 to 16, wherein the at least one memory and the computer program code are further configured to, with the at least one processor, cause the apparatus at least to: determine whether the user equipment has transmitted information regarding whether the user equipment has autonomously triggered the first operation; and in response to determining that the user equipment has not transmitted the information regarding the user equipment has autonomously triggered the first operation, perform the transmitting to the user equipment the indication of triggering the first operation for the user equipment.

Example 18: The apparatus of any one of examples 15 to 17, wherein the at least one memory and the computer program code are further configured to, with the at least one processor, cause the apparatus at least to: transmit an indication to the user equipment to switch to operation with a second operation.

Example 19: An example apparatus includes at least one processor; and at least one memory including computer program code; wherein the at least one memory and the computer program code are configured to, with the at least one processor, cause the apparatus at least to: receive from a network a configuration of two or more uplink grants; transmit uplink data to the network during operating in a given time with one of the two or more uplink grants; autonomously trigger, by the apparatus, a first operation; and operate with the first operation following the apparatus autonomously triggering the first operation; wherein operating with the first operation corresponds to at least using the one of the two or more uplink grants for uplink transmission.

Example 20: The apparatus of example 19, wherein operating with the first operation corresponding to at least using the one of the two or more uplink grants is associated with operation with a physical uplink shared channel data transmission rate.

Example 21: An example method includes receiving from a network a configuration of two or more uplink grants; transmitting uplink data to the network during operating in a given time with one of the two or more uplink grants; and operating with a first operation following receiving an indication of triggering the first operation for the apparatus, or following the apparatus autonomously triggering the first operation; wherein operating with the first operation corresponds to at least using the one of the two or more uplink grants for uplink transmission.

Example 22: An example method includes transmitting to a user equipment a configuration of two or more uplink grants; and receiving uplink data from the user equipment during operation in a given time with one of the two or more uplink grants; wherein operation with a first operation follows transmitting an indication of triggering the first operation for the user equipment, or follows the user equipment having autonomously triggered the first operation; wherein operation with the first operation corresponds to at least use of the one of the two or more uplink grants for uplink transmission.

Example 23: An example method includes receiving from a network a configuration of two or more uplink grants; transmitting uplink data to the network during operating in a given time with one of the two or more uplink grants; autonomously triggering, by the apparatus, a first operation; and operating with the first operation following the apparatus autonomously triggering the first operation; wherein operating with the first operation corresponds to at least using the one of the two or more uplink grants for uplink transmission.

Example 24: An example apparatus includes means for receiving from a network a configuration of two or more uplink grants; means for transmitting uplink data to the network during operating in a given time with one of the two or more uplink grants; and means for operating with a first operation following receiving an indication of triggering the first operation for the apparatus, or following the apparatus autonomously triggering the first operation; wherein operating with the first operation corresponds to at least using the one of the two or more uplink grants for uplink transmission.

Example 25: An example apparatus includes means for transmitting to a user equipment a configuration of two or more uplink grants; and means for receiving uplink data from the user equipment during operation in a given time with one of the two or more uplink grants; wherein operation with a first operation follows transmitting an indication of triggering the first operation for the user equipment, or follows the user equipment having autonomously triggered the first operation; wherein operation with the first operation corresponds to at least use of the one of the two or more uplink grants for uplink transmission.

Example 26: An example apparatus includes means for receiving from a network a configuration of two or more uplink grants; means for transmitting uplink data to the network during operating in a given time with one of the two or more uplink grants; means for autonomously triggering, by the apparatus, a first operation; and means for operating with the first operation following the apparatus autonomously triggering the first operation; wherein operating with the first operation corresponds to at least using the one of the two or more uplink grants for uplink transmission.

Example 27: An example non-transitory program storage device readable by a machine, tangibly embodying a program of instructions executable with the machine for performing operations is provided, the operations including: receiving from a network a configuration of two or more uplink grants; transmitting uplink data to the network during operating in a given time with one of the two or more uplink grants; and operating with a first operation following receiving an indication of triggering the first operation for the apparatus, or following the apparatus autonomously triggering the first operation; wherein operating with the first operation corresponds to at least using the one of the two or more uplink grants for uplink transmission.

Example 28: An example non-transitory program storage device readable by a machine, tangibly embodying a program of instructions executable with the machine for performing operations is provided, the operations including: transmitting to a user equipment a configuration of two or more uplink grants; and receiving uplink data from the user equipment during operation in a given time with one of the two or more uplink grants; wherein operation with a first operation follows transmitting an indication of triggering the first operation for the user equipment, or follows the user equipment having autonomously triggered the first operation; wherein operation with the first operation corresponds to at least use of the one of the two or more uplink grants for uplink transmission.

Example 29: An example non-transitory program storage device readable by a machine, tangibly embodying a program of instructions executable with the machine for performing operations is provided, the operations including: receiving from a network a configuration of two or more uplink grants; transmitting uplink data to the network during operating in a given time with one of the two or more uplink grants; autonomously triggering, by the apparatus, a first operation; and operating with the first operation following the apparatus autonomously triggering the first operation; wherein operating with the first operation corresponds to at least using the one of the two or more uplink grants for uplink transmission.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, this description is intended to embrace all such alternatives, modifications and variances which fall within the scope of the appended claims.

When a reference number as used herein is of the form y-x, this means that the referred to item is an instantiation of (or type of) reference number y or, for example if reference number y alone does not exist, a common entity. For example, module 140-1 and module 140-2 in FIG. 1 are instantiations of (e.g. a first and second instantiation) of a common or similar computer program code entity.

In the figures, lines represent couplings and arrows represent directional couplings or direction of data flow in the case of use for an apparatus, and lines represent couplings and arrows represent transitions or direction of data flow in the case of use for a method or signaling diagram.

The following acronyms and abbreviations that may be found in the specification and/or the drawing figures are defined as follows (acronyms may be appended with a dash/hyphen ("-") or with parentheses ("( )"):

3GPP third generation partnership project
4G fourth generation
5G fifth generation
5GC 5G core network
5QI 5G QoS identifier
ACK acknowledgement
AMF access and mobility management function
ASIC application-specific integrated circuit
BW bandwidth
BWP bandwidth part
CPU central processing unit
CU central unit or centralized unit
DCI downlink control information
DL downlink
DMRS demodulation reference signal
DSP digital signal processor
DU distributed unit
eNB evolved Node B (e.g., an LTE base station)
EN-DC E-UTRA-NR dual connectivity
en-gNB node providing NR user plane and control plane protocol terminations towards the UE, and acting as a secondary node in EN-DC
E-UTRA evolved universal terrestrial radio access, i.e., the LTE radio access technology
F1 interface between the CU and the DU
FPGA field-programmable gate array
gNB base station for 5G/NR, i.e., a node providing NR user plane and control plane protocol terminations towards the UE, and connected via the NG interface to the 5GC
I/F interface
I/O input/output
L1 layer 1, where layer 1 is a physical layer
LMF location management function
LTE long term evolution (4G)
MAC medium access control
MCS modulation and coding scheme
MME mobility management entity
NCE network control element
ng or NG new generation
ng-eNB new generation eNB
NG-RAN new generation radio access network
NR new radio (5G)
N/W network
PDA personal digital assistant
PDCCH physical downlink control channel
PDCP packet data convergence protocol
PHY physical layer
PRACH physical random access channel
PUCCH physical uplink control channel
PUR preconfigured UL resources
PUSCH physical uplink shared channel
QoS Quality of service
RAN radio access network
RB resource block
RedCap reduced capability
Rel release
RLC radio link control
RNTI radio network temporary identifier
RP 3GPP RAN
RRC radio resource control (protocol)
RRH remote radio head
RU radio unit
Rx receive or receiver or reception
SGW serving gateway
SON self-organizing/optimizing network
TBS transport block size
TRP transmission and/or reception point
TS technical specification
Tx transmit or transmitter or transmission
UCI uplink control information
UE user equipment (e.g., a wireless, typically mobile device)
UL uplink
UPF user plane function
WUS wake-up signal
X2 network interface between RAN nodes and between RAN and the core network
Xn network interface between NG-RAN nodes

What is claimed is:

1. An apparatus comprising:
at least one processor; and
at least one non-transitory memory storing instructions that, when executed by the at least one processor, cause the apparatus at least to:
receive from a network a configuration of two or more uplink grants;
transmit uplink data to the network during operating in a given time with one of the two or more uplink grants;

operate with a first operation for uplink data transmission using the one of the two or more uplink grants following receiving an indication of triggering the first operation for the apparatus, or following the apparatus autonomously triggering the first operation;

operate with a second operation for uplink data transmission using another one of the two or more uplink grants; and monitor for an acknowledgement from the network prior to switching to operating with the first operation from operating with the second operation when autonomously triggering the first operation under control of an access network radio node.

2. The apparatus of claim 1, wherein the instructions, when executed by the at least one processor, cause the apparatus at least to:
  inform the network that the apparatus has autonomously triggered the first operation.

3. The apparatus of claim 2, wherein the informing the network of the apparatus autonomously triggering the first operation is performed during a last uplink data transmission during operation with the second operation.

4. The apparatus of claim 3, wherein the informing the network of the apparatus autonomously triggering the operation with the first operation performed during the last uplink data transmission during operation with the second operation comprises transmission with one of at least:
  a pre-defined level of measurement;
  a medium access control message;
  a reserved bit in a medium access control sub-header;
  a demodulation reference signal sequence; or
  a scrambling of a demodulation reference signal.

5. The apparatus of claim 2, wherein the informing the network of the apparatus autonomously triggering the first operation comprises transmission with a physical layer signal.

6. The apparatus of claim 5, wherein the physical layer signal comprises one of at least:
  a dedicated signal;
  a dedicated physical random access channel preamble; or
  uplink control information in a physical uplink control channel.

7. The apparatus of claim 1, wherein the apparatus is a reduced capability user equipment.

8. The apparatus of claim 1, wherein the configuration of two or more uplink grants is received with one of at least:
  different bandwidth parts with different uplink bandwidths;
  different uplink resource block allocations in a common bandwidth part; or
  a common uplink resource block allocation with different uplink power levels.

9. The apparatus of claim 1, wherein the indication of triggering the first operation for the apparatus is received with one of at least:
  downlink control information in a physical downlink control channel; or
  a dedicated physical layer signal.

10. The apparatus of claim 1, wherein the instructions, when executed by the at least one processor, cause the apparatus at least to:
  operate with the first operation for a predetermined period of time.

11. The apparatus of claim 1, wherein the instructions, when executed by the at least one processor, cause the apparatus at least to:
  operate with the first operation until receiving an indication from the network to switch to operation with the second operation.

12. The apparatus of claim 1, wherein the instructions, when executed by the at least one processor, cause the apparatus at least to:
  determine whether the first operation is to be used based on one of at least:
  a data arrival rate at a buffer of the apparatus;
  an amount of data at a buffer of the apparatus; or
  a value of a fifth generation quality of service identifier.

13. The apparatus of claim 1, wherein the one of the two or more uplink grants for uplink data transmission is configured to be used for the first operation at a first bit rate, and the another one of the two or more uplink grants for uplink data transmission is configured to be used for the second operation at a second bit rate, wherein the first bit rate is higher than the second bit rate.

14. An apparatus comprising:
  at least one processor; and
  at least one non-transitory memory storing instructions that, when executed by the at least one processor, cause the apparatus at least to:
  receive from a network a configuration of two or more uplink grants;
  transmit uplink data to the network during operating in a given time with one of the two or more uplink grants;
  operate with a first operation for uplink data transmission using the one of the two or more uplink grants following receiving an indication of triggering the first operation for the apparatus, or following the apparatus autonomously triggering the first operation;
  operate with a second operation for uplink data transmission using another one of the two or more uplink grants;
  determine whether the network has given the indication of triggering the first operation for the apparatus; and
  in response to determining that the network has not given the indication of triggering the first operation for the apparatus, perform the autonomously triggering the first operation.

15. The apparatus of claim 14, wherein the instructions, when executed by the at least one processor, cause the apparatus at least to:
  monitor for an acknowledgement from the network prior to switching to operating with the first operation from operating with the second operation when autonomously triggering the first operation under control of an access network radio node.

16. An apparatus comprising:
  at least one processor; and
  at least one non-transitory memory storing instructions that, when executed by the at least one processor, cause the apparatus at least to:
  transmit to a user equipment a configuration of two or more uplink grants;
  receive uplink data from the user equipment during operation in a given time with one of the two or more uplink grants;
  wherein operation with a first operation follows transmitting an indication of triggering the first operation for the user equipment, or follows receiving information from the user equipment that the user equipment has autonomously triggered the first operation;
  wherein the one of the two or more uplink grants corresponds to a grant to the user equipment to operate with the first operation for uplink data transmission, and another one of the two or more uplink grants corresponds to a grant to the user equipment to operate with the second operation for uplink data transmission;

determine whether the user equipment has transmitted information regarding whether the user equipment has autonomously triggered the first operation; and in response to determining that the user equipment has not transmitted the information regarding whether the user equipment has autonomously triggered the first operation, perform the transmitting to the user equipment the indication of triggering the first operation for the user equipment.

17. The apparatus of claim 16, wherein the instructions, when executed by the at least one processor, cause the apparatus at least to:

transmit an indication to the user equipment to switch to operation with the second operation.

18. The apparatus of claim 16, wherein the instructions, when executed by the at least one processor, cause the apparatus at least to:

receive the information from the user equipment that the user equipment has autonomously triggered the first operation; and transmit an acknowledgement to the user equipment following receiving from the user equipment the information regarding the user equipment having autonomously triggered the first operation;

wherein the acknowledgement is configured to be processed with the user equipment prior to the user equipment switching to operating with the first operation from operating with the second operation when under control of an access network radio node.

19. An apparatus comprising:

at least one processor; and at least one non-transitory memory storing instructions that, when executed by the at least one processor, cause the apparatus at least to:

transmit to a user equipment a configuration of two or more uplink grants;

receive uplink data from the user equipment during operation in a given time with one of the two or more uplink grants;

wherein operation with a first operation follows transmitting an indication of triggering the first operation for the user equipment, or follows receiving information from the user equipment that the user equipment has autonomously triggered the first operation;

wherein the one of the two or more uplink grants corresponds to a grant to the user equipment to operate with the first operation for uplink data transmission, and another one of the two or more uplink grants corresponds to a grant to the user equipment to operate with the second operation for uplink data transmission;

receive the information from the user equipment that the user equipment has autonomously triggered the first operation; and transmit an acknowledgement to the user equipment following receiving from the user equipment the information regarding the user equipment having autonomously triggered the first operation;

wherein the acknowledgement is configured to be processed with the user equipment prior to the user equipment switching to operating with the first operation from operating with the second operation when under control of an access network radio node.

20. The apparatus of claim 19, wherein the instructions, when executed by the at least one processor, cause the apparatus at least to:

determine whether the user equipment has transmitted information regarding whether the user equipment has autonomously triggered the first operation; and in response to determining that the user equipment has not transmitted the information regarding whether the user equipment has autonomously triggered the first operation, perform the transmitting to the user equipment the indication of triggering the first operation for the user equipment.

* * * * *